United States Patent [19]

Bachle et al.

[11] Patent Number: 5,342,096

[45] Date of Patent: Aug. 30, 1994

[54] CONNECTOR WITH CAPTIVE SEALING RING

[75] Inventors: Walter W. Bachle, Harwinton; Raymond Chase, Terryville, both of Conn.

[73] Assignee: General Signal Corporation, Stamford, Conn.

[21] Appl. No.: 792,997

[22] Filed: Nov. 15, 1991

[51] Int. Cl.⁵ .................... F16L 55/00; F16L 57/00
[52] U.S. Cl. .................... 285/23; 285/341; 285/379; 277/9.5; 277/110; 411/533; 411/542
[58] Field of Search .......... 285/23, 341, 379; 277/9, 9.5, 181, 186, 110, 160; 411/533, 510, 542

[56] References Cited

U.S. PATENT DOCUMENTS

| | | | |
|---|---|---|---|
| 497,990 | 5/1893 | Simrell | 285/910 |
| 1,917,553 | 7/1933 | Scholtes | 277/181 |
| 2,288,506 | 6/1942 | White | 285/341 |
| 2,672,069 | 3/1954 | Mitchell | 411/533 |
| 4,000,918 | 1/1977 | Reker | 285/93 |
| 4,088,327 | 5/1978 | Bachle | 283/23 X |
| 4,169,967 | 10/1979 | Bachle | 283/23 X |
| 4,241,491 | 12/1980 | Hopp | 411/533 X |
| 4,445,714 | 5/1984 | Kisiel, III | 285/23 |
| 4,807,911 | 2/1989 | Short | 285/379 X |
| 5,037,140 | 8/1991 | Anderson | 285/341 X |

FOREIGN PATENT DOCUMENTS

| | | | |
|---|---|---|---|
| 654292 | 4/1965 | Belgium | 277/166 |
| 8237 | of 1907 | France | 277/110 |
| 431097 | 7/1935 | United Kingdom | 277/186 |
| 743690 | 1/1956 | United Kingdom | 285/341 |

Primary Examiner—Randolph A. Reese
Assistant Examiner—Heather Chun
Attorney, Agent, or Firm—Milton E. Kleinman; Raymond E. Smiley; Robert S. Smith

[57] ABSTRACT

A seal or connector and seal apparatus which includes a generally annular member having an outer surface and an inner surface and a plurality of tabs extending generally radially from at least one of the surfaces. The tabs are disposed to engage axially spaced teeth of an associated helically shaped threaded surface.

32 Claims, 3 Drawing Sheets

CONNECTOR WITH CAPTIVE SEALING RING

BACKGROUND OF THE INVENTION

The invention relates to connectors and other devices where it is desirable to have a ring, collar, seal or other member retained in association with a body member or nut.

While the invention has particular application to connectors used in the electrical and plumbing industries it will be understood that a much broader range of applications are contemplated for the invention. The connectors used in the electrical and plumbing industries are typically used to seal and mechanically connect electrical conduit, pipes or cable to junction boxes. These connectors typically incorporate rubber or plastic seals compressed by a nut that is part of the connector. It is advantageous, for the person completing the assembly of the device at a work site, to have a minimum number of discrete parts to handle. This will minimize assembly time and will minimize the risk of misplacement of the seal.

The prior art includes the structures shown in U.S. Pat. No. 4,088,377 which issued to one of the present applicants. That patent describes a sealing ring having discrete tabs on a split or discontinuous ring. The tabs engage a mating helical thread when installed and thus the split ring will be skewed. For some applications this is undesirable. This patent does also suggest the use of tabs in parallel planes. Separately, this patent also suggests a continuous ring instead of discrete tabs. While the invention described therein is useful for many applications the present invention is more suited for other applications.

A subsequently issued United States patent relating generally to the same type of structure is U.S. Pat. No. 4,241,491.

Captive sealing ring designs have generally involved an assembly that often requires a press fit. Typically, the force to assemble a sealing ring into a threaded nut requires a force equal to the axial retaining force holding the seal in place. The assembly of such seals with a threaded nut in an assembly plant has typically been done by hand. The person who is performing the assembly operation in an assembly plant is thus exposed to wrist and other injuries because of the repetitive nature of the work. Mechanized assembly of seal and nut assemblies is not satisfactory because of the necessity for costly machinery.

It is an object of the invention to provide an assembly that includes a captive nut assembly that can be assembled with substantially less physical effort than known apparatus.

It is an object of the invention to provide apparatus which is inexpensive to manufacture as well as requires a minimum of labor to install.

SUMMARY OF THE INVENTION

It has now been found that these and other objects of the invention may be attained in a seal apparatus which includes a generally annular member having an outer surface and an inner surface and a plurality of tabs extending generally radially from at least one of the surfaces. The tabs are disposed to engage axially spaced portions of an associated helically shaped threaded surface.

In some forms of the invention the tabs extend radially outward from the annular member and may be dimensioned and configured to cause deformation of the annular member intermediate the tabs. The tabs may be disposed at equal angular intervals about the annular member and may be dimensioned and configured to cause deformation of the annular member intermediate the tabs that causes bowing out of the seal. In some forms of the invention the annular member has a thickness that is less than the diameter thereof. The annular member may be a continuous ring having no discontinuity about the extent thereof.

Another form of the invention is a connector apparatus for an associated conduit that includes a tubular body including an externally threaded first portion connected to an externally threaded second portion. The first and second portions form respective first and second bores which mutually communicate though the tubular body from a first end to a second end of the body. The body includes a conduit receiving means. A nut surrounds the conduit receiving means and has internal threads which are in threaded engagement with the first portion. An inside surface of the nut and a surface of the first end form an annular compression space therebetween. The annular compression space surrounds the conduit receiving means and a generally annular member is disposed in the annular compression space. The member has an outer surface and a plurality of tabs extending generally radially outward from the outer surface. The tabs are disposed to engage axially spaced portions of the internal threads.

The connector may include various forms of the seal as described above.

BRIEF DESCRIPTION OF THE DRAWING

The invention will be better understood by reference to the accompanying drawing in which.

DESCRIPTION OF THE PREFERRED EMBODIMENT

Figure 2:
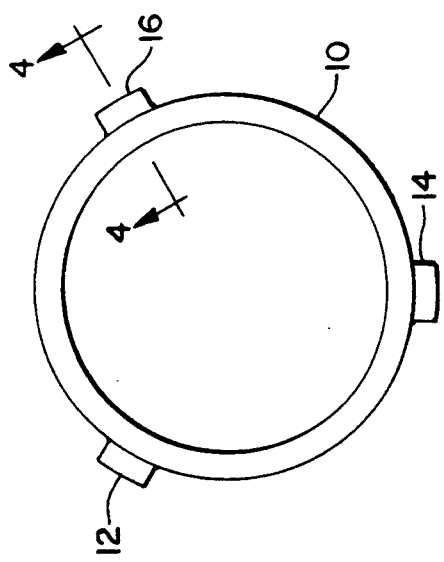
FIG. 2 is a view of the sealing ring itself, showing the three tabs enables the ring to be captured in a nut.
Figure 3:
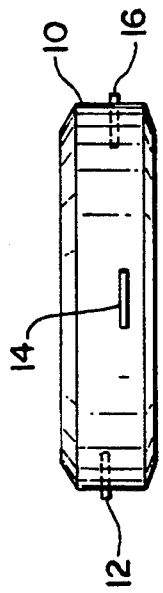
FIG. 3 is a side view of the ring. This illustrates how the tabs are displaced axially so as to conform to the helix of the internal thread in the nut.

Referring now to FIGS. 1-7 there is shown a seal or sealing ring 10. On the exterior surface of the seal or sealing ring 10 are a plurality of radially extending tabs 12, 14, 16. The tabs 12, 14, 16 as best seen in FIG. 2 are spaced in the preferred embodiment at equal angular intervals about the periphery of the ring 10. As best seen in FIG. 3 the tabs 12, 14, 16 are axially spaced so that they will mesh with a mating helical thread. Stated another way, the respective tabs 12, 14, 16 coincide with portions of an imaginary helical thread that is dimensioned and configured to engage a cooperating helical thread 18 of a machined nut 20.

Figure 4:
FIG. 4 is a section view thru one of the tabs.
Figure 1:
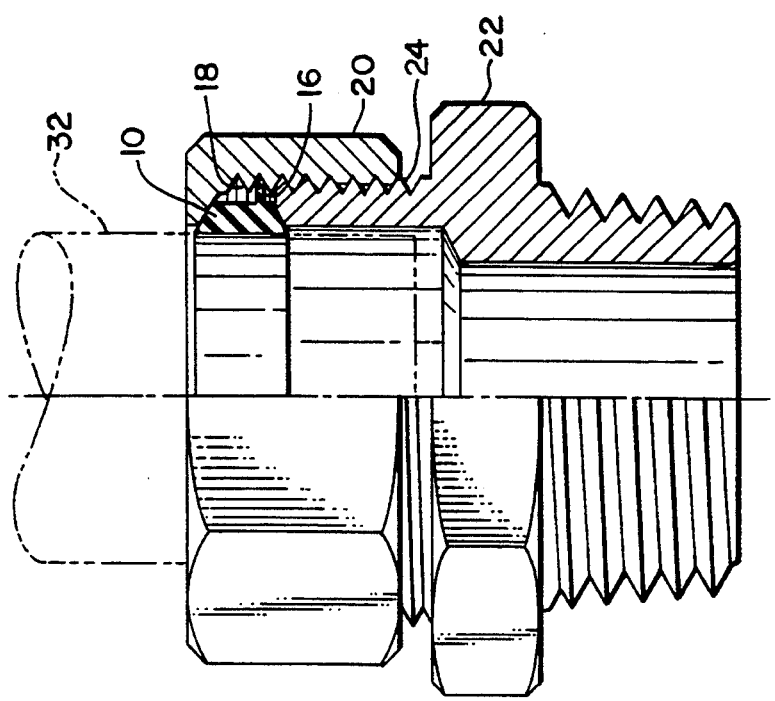
FIG. 1 is a partial section view showing the sealing ring in place in a complete assembly.

As best seen in FIG. 1 the sealing ring 10 is assembled in a assembly that includes the nut 20 and a body 22. The body 22 includes helical threads 24 that also cooperate with the threads 18 of the nut 20. The geometry of all the individual tabs 12, 14, and 16 are ordinarily all the same. FIG. 4 illustrates the tab 16 in greater detail.

Figure 5:
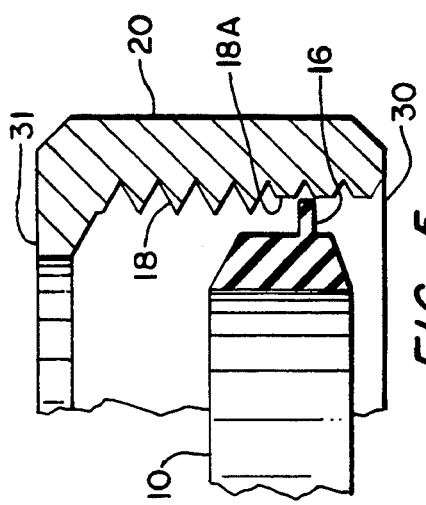
FIG. 5 is a section view similar to that in FIG. 1, but to a larger scale, and showing the ring entering the nut, and with the tabs passing easily past the first few threads which are truncated.

Referring now to FIG. 5, the helical thread 18 of the nut 20 is characterized by an axial portion thereof being truncated. More particularly, the truncated threads 18A are disposed on the first few threads of the nut 20. In other words the threads 18A are on the axial portion of the nut 20 which first pass over the seal 10 as it is positioned inside the nut 20. Those skilled in the art will recognize that the nut 20 has an "open" end 30 and a "closed" end that compresses the seal 10 against both a piece of tubing 32 and the body 22 as best seen in FIG. 1.

Figure 6:
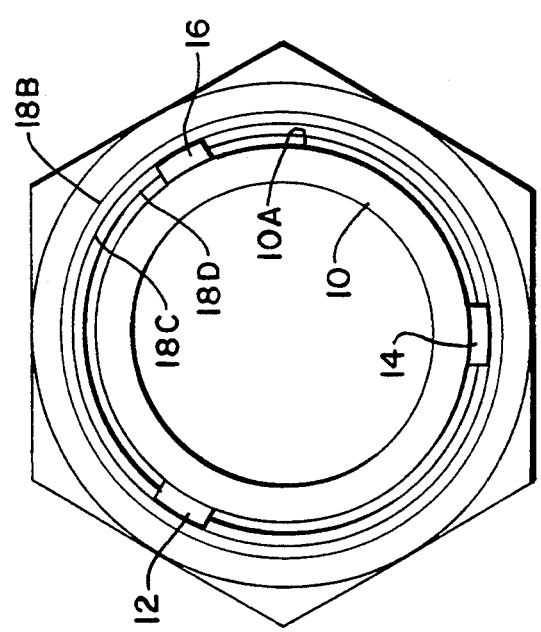
FIG. 6 is an axial view of the ring and nut shown in FIG. 5. Since there is substantially no diametral interference between the tabs and the first few threads, the ring is still circular in shape, with no distortion.

As also best seen in FIG. 5 as the ring 10 initially enters the nut 20 the tabs 12, 14, 16 passing easily past the first few truncated threads 18A. The geometric relationship with the seal 10 in the position shown in FIG. 5 is further illustrated in FIG. 6 illustrating an axial view of the ring 10 and nut 20. Since there is substantially no diametral interference between the tabs 12, 14, and 16 and the first few truncated threads 18A, the ring 10 is circular in shape, with no distortion. In other words, the shape of the ring 10 is the same as that shown in FIG. 2.

Figure 7:
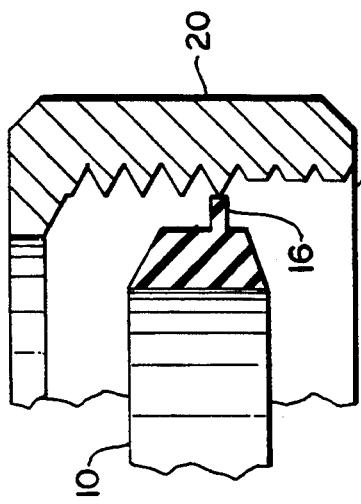
FIG. 7 is a section similar to FIG. 5 but with the tabs passing over the full (non-truncated) thread.
Figure 8:
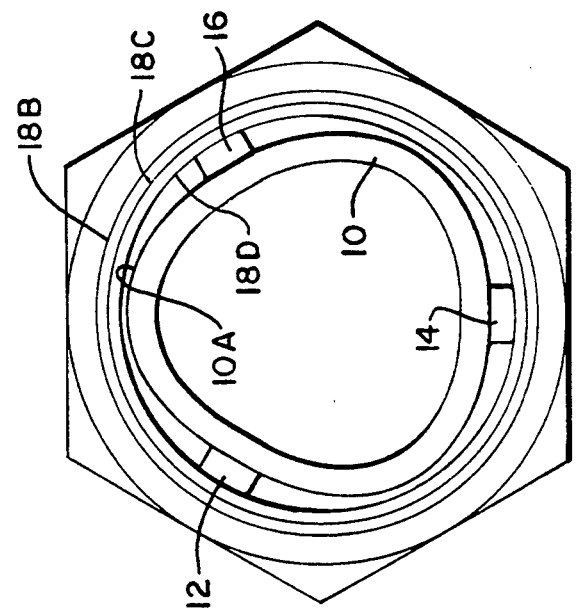
FIG. 8 is an axial view of the ring and nut shown in FIG. 7. Since there is diametral interference between the tabs and the threads, the ring is not circular in shape.

As best seen in FIGS. 7 and 8 upon further movement of the ring 10 into the nut 20 the tabs 12, 14, and 16 engage the respective troughs of fully formed threads 18 and capture the seal 10 within the nut 20. Since there is now definite interference between the outer diameter of the tabs 12, 14, 18 and the inner diameter of the threads 18, the portions of the ring 10 at the tabs 12, 14, 16 are forced radially inward to allow the tabs 12, 14, 18 to pass. This causes the portions of the ring 10 midway between the adjacent tabs 12, 14, 18 to bow outward, as shown in FIG. 8. Since there is clearance between the ring outer diameter and the thread inside diameter as shown in FIGS. 5 and 6 this distortion is allowed to take place.

Ordinarily, the outer diameter 10A of the seal 10 does not touch the minor diameter of the threads 18. If greater stiffness is required the seal and the tabs 12, 14, 16 may be dimensioned to provide contact between the outer diameter 10A of the seal 10 and the minor diameter of the threads 18. The spring constant of the seal 10 is a function of the force required to bend the portions of the seal intermediate adjacent tabs 12, 14, 16. The spring constant is also a function of the distance between the tabs 12, 16, and 18, the modulus and dimensions of the sealing ring 10. Those skilled in the art will recognize that the number of tabs 12, 14, 18 may be varied for specific applications.

The axial retaining force of the seal 10 is a function of the radial forces which are a function of the spring constant and the geometry of the thread 18 form. More particularly, it is a function of the slope of the threads 18. The radial forces critical to this axial force is equal to the distance the tabs have to move in an inward radial direction (to move over the crest of the thread form and the spring constant of the seal 10).

In FIGS. 6 and 8 the major diameter of the threads 18 is indicated by the reference numeral 18B. The minor diameter of the truncated threads 18A is indicated by the numeral 18C. The minor diameter of the internal threads 19 is indicated by the numeral 18D. The outer diameter of the seal 10 is indicated by the numeral 10A.

Figure 9:
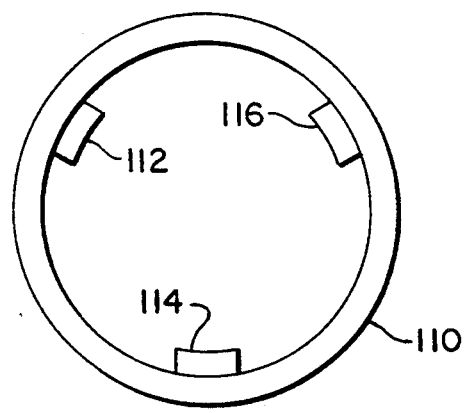
FIG. 9 is a view of an alternate embodiment of the sealing ring itself, showing three tabs for engaging external threads.

The seal 10 will ordinarily be manufactured of a material which is elastic enough to seal and stiff enough to act as a spring member. Although the invention has been described in term of tabs 12, 14, and 16 that extend radially outward it will be understood by those skilled in the art that radially inward extending tabs 112, 114, and 116 as shown in FIG. 9 are also contemplated by the invention. For example, a seal might have tabs that extend inwardly to grip external threads such as on spark plugs.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described our invention we claim:

1. A seal apparatus which comprises:
   a generally annular member having an outer surface and an inner surface and a plurality of tabs extending generally radially from at least one of said surfaces,
   said tabs being disposed to engage axially spaced portions of an associated helically shaped threaded surface, said tabs extending radially outward from said annular member; said apparatus includes means for bending, said annular member intermediate said tabs so that said inner and outer surfaces are not circular, said means for bending comprising said tabs.

2. The apparatus as described in claim 1 wherein:
   said tabs are disposed at equal angular intervals about said annular member.

3. The apparatus as described in claim 2 wherein:
   said means for bending said annular member intermediate said tabs causes bowing out of said seal apparatus.

4. The apparatus as described in claim 3 wherein:
   said annular member has a thickness that is less than the diameter thereof.

5. The apparatus as described in claim 4 wherein:
   said annular member is a continuous ring having no discontinuity about the extent thereof.

6. The apparatus as described in claim 1 wherein:
   said plurality of tabs extending generally radially from at least one of said surfaces register with the troughs of an associated helically shaped threaded surface.

7. A connector apparatus for an associated conduit comprising:
   a tubular body including an externally threaded first portion connected to an externally threaded second portion, said first and second portions forming respective first and second bores which mutually communicate through said tubular body from a first end to a second end of said body, said body including a conduit receiving means;
   a nut surrounding said conduit receiving means and having internal threads which are in threaded engagement with said first portion, an inside surface of said nut and a surface of said first end forming an annular compression space therebetween, said annular compression space surrounding said conduit receiving means; and a generally annular member being disposed in said annular compression space, said member having an outer surface and a plurality of tabs extending generally radially outward from said outer surface, said tabs being disposed to engage axially spaced portions of said internal threads.

8. The apparatus as described in claim 7 wherein:
said plurality of tabs extending generally radially from at least one of said surfaces register with the troughs of an associated helically shaped threaded surface.

9. The apparatus as claimed in claim 7, wherein:
said internal threads have a first axial portion having a minor diameter that is larger than the minor diameter of a second axial portion thereof.

10. The apparatus as described in claim 9 wherein:
said plurality of tabs extending generally radially from at least one of said surfaces register with the troughs of an associated helically shaped threaded surface.

11. The apparatus as described in claim 9 wherein:
said means for bending causes bowing out of said annular member intermediate said tabs.

12. The apparatus as described in claim 11 wherein:
said plurality of tabs extending generally radially from at least one of said surfaces register with the troughs of an associated helically shaped threaded surface.

13. The apparatus as described in claim 11 wherein:
said tabs are disposed at equal angular intervals about said annular member.

14. The apparatus as described in claim 13 wherein:
said plurality of tabs extending generally radially from at least one of said surfaces register with the troughs of an associated helically shaped threaded surface, a generally annular member having an outer surface and an inner surface and a plurality of tabs extending generally radially at axially spaced parts of at least one of said surfaces, said tabs being disposed to engage axially spaced portions of an associated helically shaped threaded surface, said tabs extending radially outward from said annular member, said apparatus includes means for deforming said annular member intermediate said tabs, said means for deforming comprising said tabs.

15. The apparatus as described in claim 13 wherein:
said tabs have an interference fit with the associated helically shaped threaded surface.

16. The apparatus as described in claim 15:
said annular member is a continuous ring having no discontinuity about the extent thereof.

17. A seal apparatus which comprises:
a generally annular member having an outer surface and an inner surface and a plurality of tabs extending generally radially at axially spaced parts of at least one of said surfaces, said tabs being disposed to engage axially spaced portions of an associated helically shaped threaded surface, said tabs extending radially outward from said annular member, said apparatus including means for deforming said annular member intermediate said tabs, said means for deforming including said tabs.

18. The apparatus as described in claim 17 wherein:
said plurality of tabs extending generally radially from at least one of said surfaces register with the troughs of an associated helically shaped threaded surface.

19. A seal apparatus which comprises:
a generally annular member having an outer surface and an inner surface and a plurality of tabs extending generally radially at axially spaced parts of at least one of said surfaces, said tabs being disposed to engage axially spaced portions of an associated helically shaped threaded surface, said tabs extending radially outward from said annular member, said apparatus including means for deforming said annular member intermediate said tabs, said means for deforming comprising said tabs, said tabs being disposed at equal angular intervals about said annular member.

20. The apparatus as described in claim 19 wherein:
said means for deforming said annular member includes means for causing said annular member intermediate said annular member to bow outwardly.

21. The apparatus as described in claim 20 wherein:
said annular member has a thickness that is less than the diameter thereof.

22. The apparatus as described in claim 21 wherein:
said annular member is a continuous ring having no discontinuity about the extent thereof.

23. A connector apparatus for an associated conduit comprising:
a tubular body including an externally threaded first portion connected to an externally threaded second portion, said first and second portions forming respective first and second bores which mutually communicate through said tubular body from a first end to a second end of said body, said body including a conduit receiving means;

a nut surrounding said conduit receiving means and having internal threads which are in threaded engagement with said first portion, an inside surface of said nut and a surface of said first end forming an annular compression space therebetween, said annular compression space surrounding said conduit receiving means; and a generally annular member being disposed in said annular compression space, said member having an outer surface and a plurality of tabs extending generally radially from said outer surface, said tabs being disposed at axially spaced parts of said outer surface and disposed to engage axially spaced portions of said internal threads.

24. The apparatus as claimed in claim 23, wherein:
said internal threads have a first axial portion having a minor diameter that is larger than the minor diameter of a second axial portion thereof.

25. The apparatus as described in claim 24 wherein:
said plurality of tabs extending generally radially from at least one of said surfaces register with the troughs of an associated helically shaped threaded surface.

26. The apparatus as described in claim 24 wherein:
said apparatus includes means for deforming said annular member intermediate said tabs, said means for deforming comprising said tabs.

27. The apparatus as described in claim 26 wherein:
said plurality of tabs extending generally radially from at least one of said surfaces register with the troughs of an associated helically shaped threaded surface.

28. The apparatus as described in claim 23 wherein:
said plurality of tabs extending generally radially from at least one of said surfaces register with the troughs of an associated helically shaped threaded surface.

29. A connector apparatus for an associated conduit comprising:
a tubular body including an externally threaded first portion connected to an externally threaded second portion, said first and second portions forming respective first and second bores which mutually communicate through said tubular body from a first end to a second end of said body, said body including a conduit receiving means;
a nut surrounding said conduit receiving means and having internal threads which are in threaded engagement with said first portion, an inside surface of said nut and a surface of said first end forming an annular compression space therebetween, said annular compression space surrounding said conduit receiving means; and
a generally annular member being disposed in said annular compression space, said member having an outer surface and a plurality of tabs extending generally radially outward from said outer surface,
said tabs being disposed at axially spaced parts of said outer surface and disposed to engage axially spaced portions of said internal threads, said internal threads having a first axial portion having a minor diameter that is larger than the minor diameter of a second axial portion thereof, said apparatus includes means for bending said annular member intermediate said tabs, said means for bending comprising said tabs, said tabs being disposed at equal angular intervals about said annular member.

30. The apparatus as described in claim 29 wherein:
said tabs having an interference fit with said internal threads.

31. The apparatus as described in claim 30:
said annular member is a continuous ring having no discontinuity about the extent thereof.

32. A connector apparatus for an associated conduit comprising:
a tubular body including an externally threaded first portion connected to an externally threaded second portion, said first and second portions forming respective first and second bores which mutually communicate through said tubular body from a first end to a second end of said body, said body including a conduit receiving means;
a nut surrounding said conduit receiving means and having internal threads which are in threaded engagement with said first portion, an inside surface of said nut and a surface of said first end forming an annular compression space therebetween, said annular compression space surrounding said conduit receiving means; and
a generally annular member being disposed in said annular compression space, said member having an outer surface and a plurality of tabs extending generally radially outward from said outer surface,
said tabs being disposed at axially spaced parts of said outer surface and disposed to engage axially spaced portions of said internal threads, said internal threads having a first axial portion having a minor diameter that is larger than the minor diameter of a second axial portion thereof, said apparatus includes means for bending said annular member intermediate said tabs, said means comprising said tabs, said tabs being dimensioned and configured to cause deformation of said annular member intermediate said tabs, said tabs being disposed at equal angular intervals about said annular member, said plurality of tabs extending generally radially from at least one of said surfaces register with the troughs of an associated helically shaped threaded surface.

* * * * *